US006993482B2

(12) United States Patent
Ahlenius

(10) Patent No.: US 6,993,482 B2
(45) Date of Patent: Jan. 31, 2006

(54) METHOD AND APPARATUS FOR DISPLAYING SPEECH RECOGNITION RESULTS

(75) Inventor: Mark T. Ahlenius, Lombard, IL (US)

(73) Assignee: Motorola, Inc., Schaumburg, IL (US)

(*) Notice: Subject to any disclaimer, the term of this patent is extended or adjusted under 35 U.S.C. 154(b) by 259 days.

(21) Appl. No.: 10/323,500

(22) Filed: Dec. 18, 2002

(65) Prior Publication Data
US 2004/0122666 A1 Jun. 24, 2004

(51) Int. Cl.
*G10L 15/26* (2006.01)
(52) U.S. Cl. ...................................................... 704/235
(58) Field of Classification Search ........ 704/231–246, 704/270, 275, 276
See application file for complete search history.

(56) References Cited

U.S. PATENT DOCUMENTS

| | | | | |
|---|---|---|---|---|
| 5,761,687 A | * | 6/1998 | Hon et al. | 704/246 |
| 5,799,273 A | * | 8/1998 | Mitchell et al. | 704/235 |
| 5,864,805 A | * | 1/1999 | Chen et al. | 704/235 |
| 6,006,183 A | * | 12/1999 | Lai et al. | 704/235 |
| 2002/0128833 A1 | * | 9/2002 | Steinbiss | 704/235 |
| 2002/0133340 A1 | * | 9/2002 | Basson et al. | 704/235 |

OTHER PUBLICATIONS

Communications Solutions TMC Labs, SpeechWorks 6.0, Apr. 2000, pp. 1-5.*
Rabiner, Lawrence, Juang, Biing-Huang, Fundamentals of Speech Recognition, 1993, ATT&T, pp. 274-275.*

* cited by examiner

Primary Examiner—David D. Knepper
(74) Attorney, Agent, or Firm—Vedder, Price, Kaufman & Kammholz, P.C.

(57) ABSTRACT

The method and apparatus for displaying speech recognition results includes a recognition filter (102) that receives a recognition result list (106) which includes a plurality of speech recognized terms (122), wherein each speech recognized term (122) has a term-specific recognition confidence value (124). The recognition filter (102) generates a modified recognition result list (108) that includes one or more speech recognized terms having term-specific recognition confidence values. The method and apparatus also includes a display generator (104) that receives the modified recognition result list (108) and generates a graphical recognition result list (110). The graphical recognition result list (110) includes speech recognized terms and a non-alphanumeric symbol as a graphical representation (274) of the term-specific recognition confidence value (128) and a speech recognized term (126).

26 Claims, 6 Drawing Sheets

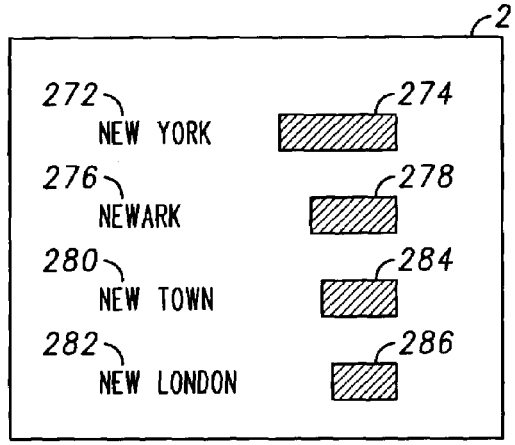
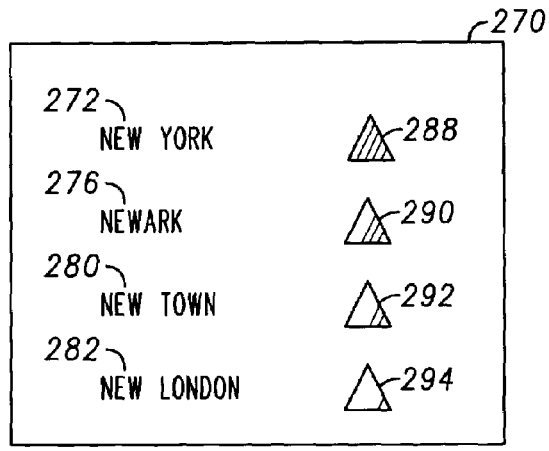
FIG. 8
FIG. 9
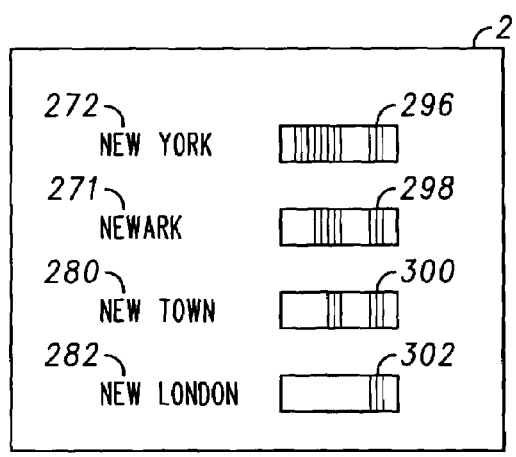
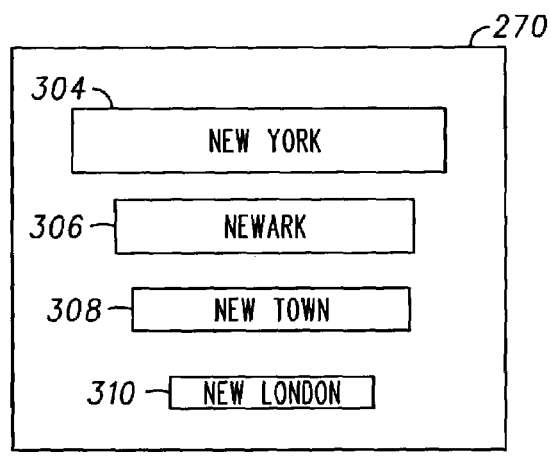
FIG. 10
FIG. 11

US 6,993,482 B2

METHOD AND APPARATUS FOR DISPLAYING SPEECH RECOGNITION RESULTS

BACKGROUND OF THE INVENTION

The invention relates generally to speech recognition, and more specifically, to the graphical representation of a confidence value of an associated speech recognition result.

With the growth of speech recognition capabilities, there is a corresponding increase in the number of applications and uses for speech recognition. Different types of speech recognition application and systems have been developed, based on the location of the speech recognition with respect to the user. One such example is a local or embedded speech recognition engine, such as a SpeechToGo speech recognition engine, sold by Speech Works International, Inc., 695 Atlantic Avenue, Boston, Mass., 02111. Another type of speech recognition engine is a network-based speech recognition engine, such as Speech Works 6, as sold by Speech Works International, Inc., 695 Atlantic Avenue, Boston, Mass., 02111.

Embedded or local speech recognition engines provide the added benefit of speed in recognizing a speech input, wherein a speech input includes any type of audible or audio-based input. A drawback of embedded speech or local speech recognition engines is that these engines contain a limited vocabulary. Due to memory limitations and system processing requirements, in conjunction with power consumption limitations, embedded or local speech recognition engines provide recognition to only a fraction of the audio inputs which would be recognizable by a network-based speech recognition engine.

Network-based speech recognition engines provide the added benefit of an increased vocabulary, based on the elimination of memory and processing restrictions. Although, a downside is the added latency between when a user provides a speech input and when the speech input may be recognized and provided back to the user for confirmation of recognition. In a typical speech recognition system, the user provides the audio input and the audio input is thereupon provided to a server across communication path, whereupon it may then be recognized. In another embodiment, the audio input may also be provided to the embedded speech recognition engine.

A problem arises when a recognized result includes a plurality of recognized terms, wherein each of the plurality of recognized terms has an associated confidence value within a predetermined threshold range. It is important to provide the user the list of recognized terms that fall within the predetermined threshold range, such that the user may select the appropriately recognized term. Furthermore, within a device having a limited amount of display, there is a need for an efficient way of displaying the recognized results and their associated confidence values so the user is provided with automatic and direct feedback of the speech recognition. While there exists systems that provide the generated N-best list to the end user in order of the recognition confidence values, with a limited amount of display space, there does not exist systems which may provide for non-alphanumeric symbols representing the associated confidence levels. For instance, a typical speech recognition result list may include the list of terms numbered in order, but does not provide any indication of the difference between the confidence levels of the various terms. It is beneficial for providing an end user with the recognition result list having an associated representation of recognition results such that the user may better understand the associated capabilities of the speech recognition engines. Moreover, in a display area having a very limited amount of display space, it is also extremely difficult to provide a visual indication of the speech recognition list and the associated confidence values, and the difference between each of the terms of the associated list.

BRIEF DESCRIPTION OF THE DRAWINGS

The invention will be more readily understood with reference to the following drawings wherein:

FIG. 8 illustrates one example of a non-alphanumeric representation of an N-best speech recognition result list;

FIG. 9 illustrates another example of a non-alphanumeric representation of an N-best speech recognition result list;

FIG. 10 illustrates another example of a non-alphanumeric representation of an N-best speech recognition result list;

FIG. 11 illustrates another example of a non-alphanumeric representation of an N-best speech recognition result list.

DETAILED DESCRIPTION OF A PREFERRED EMBODIMENT OF THE INVENTION

Briefly, a method and apparatus for displaying speech recognition results includes a recognition filter capable of receiving a recognition result list that includes a plurality of speech recognized terms. Each of the speech recognized terms has a term-specific recognition confidence value, such that the recognition filter thereupon may generate a modified recognition result list including at least one of the plurality of speech recognized terms having the term-specific recognition confidence value associated therewith.

The method and apparatus for displaying speech recognition results further includes a display generator which is coupled to the recognition filter. The display generator receives the modified recognition result list and thereupon generates a graphical recognition result list. The graphical recognition result list includes one or more of the speech recognized terms and, for each of the speech recognized terms, a graphical representation of the term-specific recognition confidence value. The graphical representation of the term-specific recognition confidence value is a non-alphanumeric symbol. The apparatus and method further includes displaying the recognized terms and the graphical representation of the term-specific confidence value.

Figures 1, 2, 3:
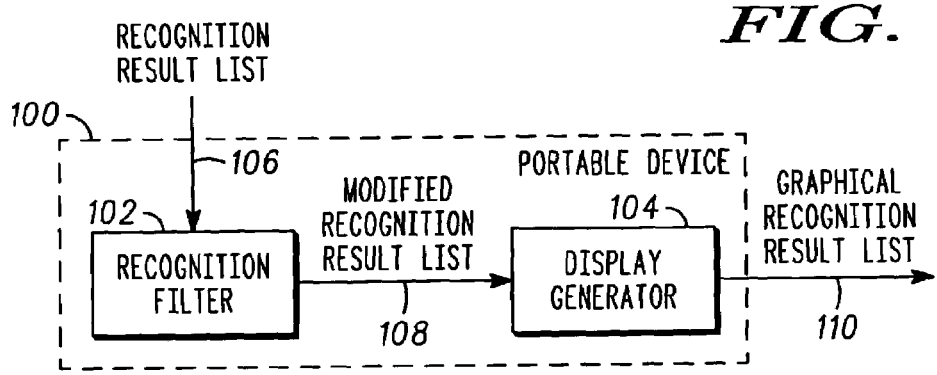
FIG. 1 illustrates one example of an apparatus for displaying speech recognition results.
FIG. 2 illustrates one example of a speech recognition N-best list and the associated confidence levels.
FIG. 3 illustrates another example of an N-best speech recognition list having confidence levels and an associated delta value.

FIG. 1 illustrates a portable device 100 that includes a recognition filter 102 and a display generator 104. The recognition filter 102 includes any device readily incorporated in either hardware or software that can receive a recognition result list 106 and thereupon generate a modified recognition result list 108. The display generator 104 receives the modified recognition result list 108 and thereupon generates a graphical recognition result list 110. The portable device 100 includes any device capable of receiving an audio input (not shown) and thereupon receiving the recognition result list 106, such as a wireless or non-wireless device capable of communicating with a server or other communication network, including, but not limited to, a cellular phone, a laptop computer, a desktop computer, a pager, a smartphone, a personal digital assistant, or any other portable device capable of performing or receiving speech recognition.

The recognition filter 102 may contain a minimal confidence threshold value and a maximum confidence threshold value, whereupon the recognition result list 106 is filtered, thereby removing all speech recognition terms not within the confidence value thresholds. In another embodiment, the recognition filter may also discard all terms having a recognition value below a specific confidence value if there exists at least one or more recognition terms having a confidence value above the maximum confidence threshold value. Moreover, in another embodiment, the recognition filter 106 may also generate an error message in the event that there does not exist any speech recognition terms having a recognition confidence level above the minimum threshold confidence value. It should also be noted, that in one embodiment, the recognition confidence threshold values may be determined by an end user.

The display generator 104, upon receiving the modified recognition result list, generates a non-alphanumeric symbol as a graphical representation for each of the term-specific recognition confidence values. Thereupon, the graphical recognition result list 110 includes the speech recognition term and the associated graphical representation. In one embodiment, the graphical recognition result list 110 may be provided to a display (not shown) that may be incorporated within the portable device 100.

For illustration purposes, FIG. 2 illustrates a recognition result list as provided from a speech recognition engine. The recognition result list 120 includes a term list 122 and a confidence value list 124. This recognition result list 106 is typically in response to a speech input provided to a speech recognition engine. Using the exemplary terms 122, the recognition result list includes the terms "New York" 126 having a confidence value of "68" 128, the term "Newark" 130 having a confidence value of "64" 132, the term "Newtown" 134 having a confidence value of "62" 136, the term "New London" 138 having a confidence value of "52" 140, the term "New Castle" 142 having a confidence value of "44" 144, the term "New Haven" 146 having a confidence value of "36" 148 and the term "Nevada" 150 having a confidence value of "30" 152. In one embodiment, this recognition result list 106 is thereupon provided to the recognition filter 102 of FIG. 1.

FIG. 3 illustrates, in table format, the modified recognition result list 108 based upon the recognition result list 106. The modified recognition result list 108 includes terms 160, a delta value 162 and a confidence value 164. For exemplary purposes only, assume the recognition filter 102 included a maximum confidence threshold value of 70% and a minimum confidence threshold value of 50%, therefore the terms "New York" 126, "Newark" 130, "Newtown" 134, and "New London" 138 are the sole terms within the modified recognition result list 108. Furthermore, the associated confidence values 128, 132, 136, and 144, respectively, are also within the modified recognition result list 108. Further included are delta values 162 which indicate the difference between associated term confidence values, such as a delta value of 4 for the term Newark 130 which has a confidence value 64% 132 which is a difference in confidence values of four percent between the term New York 126 which has a confidence value of 68% 128.

Figure 4:
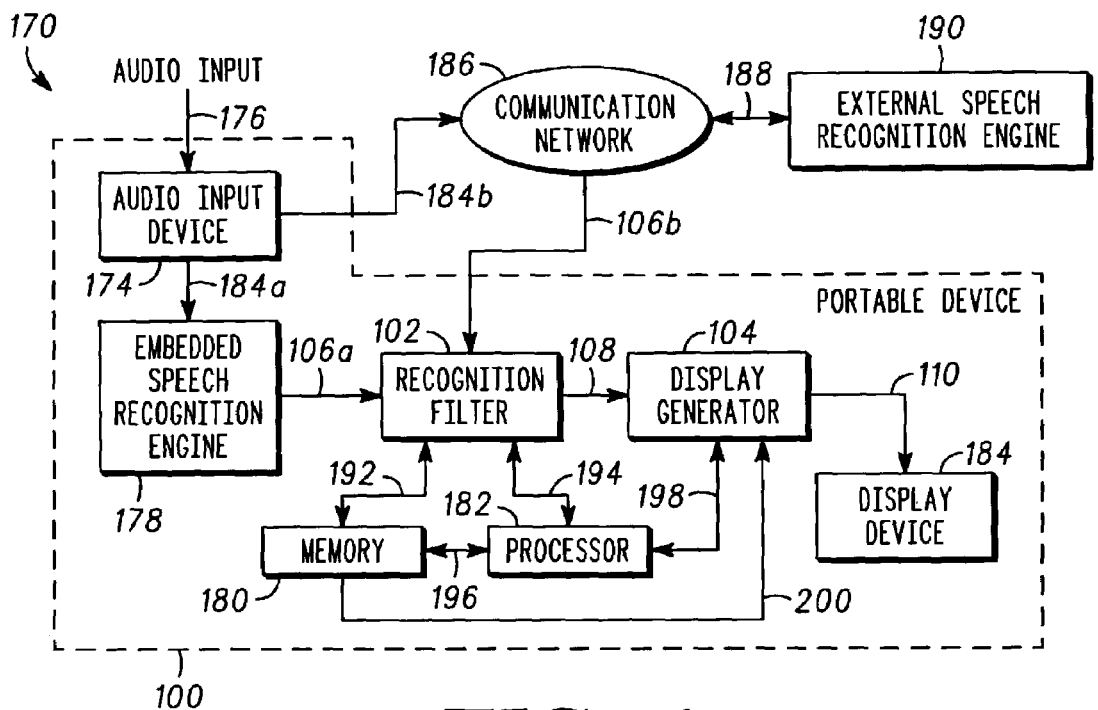
FIG. 4 illustrates another example of an apparatus for displaying speech recognition results.

FIG. 4 illustrates a system 170 having the portable device 100 which has an audio input device 174, such as a microphone or any other device capable of receiving an audio input 176. The audio input 176 typically is a spoken command provided by an end user, but may be any other type of audible input provided to the audio input device 174. The portable device 100 further includes an embedded speech recognition engine 178. The portable device 100 further includes recognition filter 102 and the display generator 104.

The recognition filter 102 is coupled to a memory 180 and a processor 182 and the display generator 104 is coupled to a display device 184. The processor 182 may be, but not limited to, a processor, a plurality of processors, a DSP, a microprocessor, ASIC, state machine, or any other implementation capable of processing and executing software or discrete logic or any other suitable combination of hardware, software and/or firmware. The term processor should not be construed to refer exclusively to hardware capable of executing software, and may implicitly include DSP hardware, ROM for storing software, RAM, and any other volatile or non-volatile storage medium. The memory 180 may be, but not limited to a single memory, plurality of memory locations, shared memory, CD, DVD, ROM, RAM, EEPROM, Optical storage, or any other non-volatile storage capable of storing digital data for use by the processor 182. The display device 184 may be a speaker or audio output, a display or monitor for video output, or any other suitable interface providing an output, as recognized by one having ordinary skill in the art.

The audio input device 174 may provide encoded audio input 184A to the embedded speech recognition engine 178 which may thereupon generate the recognition result list 106A. In another embodiment, if the portable device 100 is a wired or wireless device capable of communicating through a communication network 186, the audio input device 174 may provide encoded audio input 184B to the communication network such that the communication network may thereupon provide a speech input 188 to an external speech recognition engine 190. The external speech recognition engine 196, or network-based speech recognition engine may be Speech Works 6, as sold by Speech Works International, Inc., 695 Atlantic Avenue, Boston, Mass. 02111. The communication network 186 may be a wireless area network, a wireless local network, a cellular communication network, or any other suitable network providing communication between the portable device 100 and the external speech recognition engine 190. Thereupon, the communication network 186 may provide a network-based recognition result list 106B to the recognition filter 102.

In one embodiment, as discussed above, recognition filter 102 generates the modified recognition result list 108 which is provided to the display generator 104, such that a graphical recognition result list 110 may be provided to the display device 184.

The recognition filter 102 may receive filter information 192 from the memory 180 or information 194 from the processor 182. In one embodiment, the recognition filter 102 may retrieve filter information 192 directly from the memory 180 or in another embodiment, the processor 182 may execute executable instructions 196 provided from the memory 180, in response to those executable instructions, may provide filter information 194 to the recognition filter 102. In one embodiment, the filter information may include a maximum confidence threshold value and a minimum confidence threshold value such that the modified recognition result list 104 is generated in view of these threshold values. The filter information 192 or 194 may further include a weighting indicator capable of being applied to each of the speech recognized terms to thereupon adjust the term-specific recognition confidence values.

The display generator 104 may further receive a preference signal 198 from the processor 182 or a preference signal 200 from the memory 180, in the same circumstances that the recognition filter 102 receives filter information 192 and 194. The preference signal 198 or 200 includes information providing for the indication of the graphical representation of the graphical recognition result list 110. Disposed within the display generator 104, the graphical representation may be a plurality of lines having varying colors, a plurality of lines having varying widths, a plurality of lines having varying spacing disposed therebetween or a geometric element having at least one line indicator disposed therein, such as discussed below with respect to FIGS. 8–10.

Figure 5:
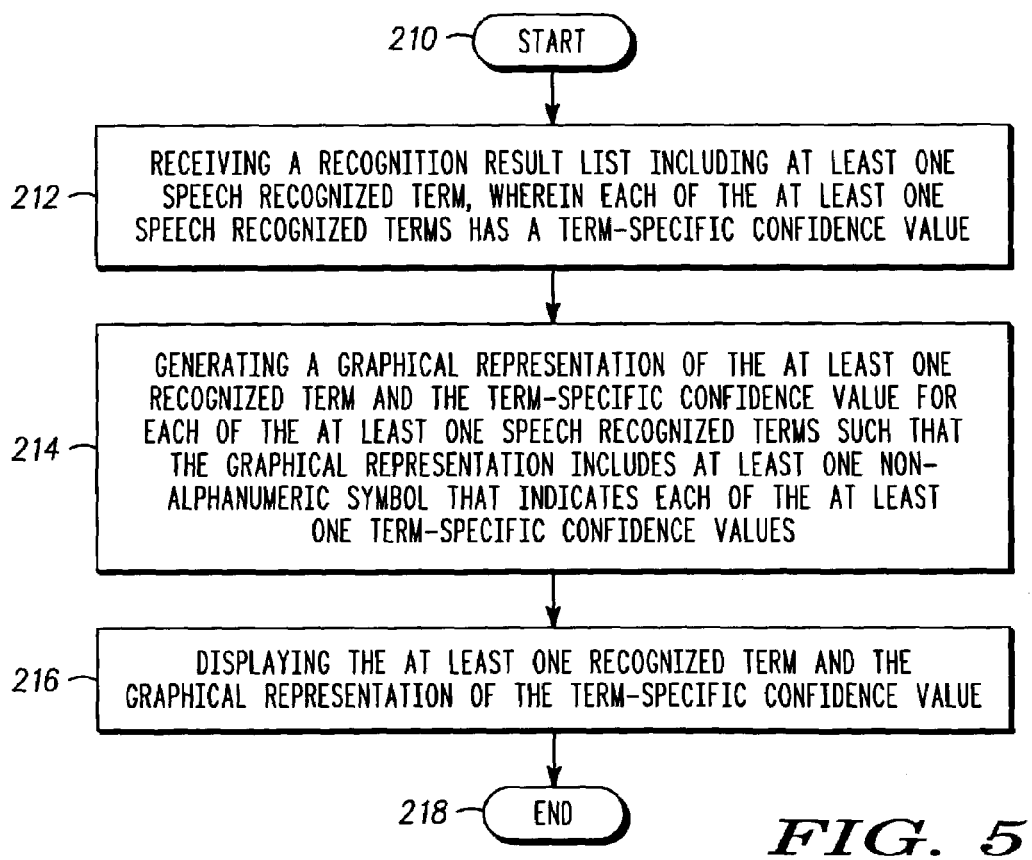
FIG. 5 illustrates an example of a method for displaying speech recognition results.

FIG. 5 illustrates a flow chart of the steps of one embodiment of the method for displaying speech recognition results, wherein the method begins step 210, by receiving a recognition result list including at least one speech recognized term, wherein each of the at least one speech recognized terms has a term-specific confidence value, step 212. As illustrated with respect to FIG. 1, the recognition result list 106 has a plurality of recognition terms 122 each having a term-specific confidence value 124. The next step of the method, 214, is generating a graphical representation of the at least one recognized term and the term-specific confidence value for each of the at least one speech recognized terms, such that the graphical representation includes at least one non-alphanumeric symbol that indicates each of the at least one term-specific confidence values.

In another embodiment, a modified recognition result list 108 is generated and the graphical representation of the at least one recognized term is based on the modified recognition result list 108, as discussed above with FIG. 1, generated by the display generator 104. The next step, 216 includes displaying the at least one recognized term and the graphical representation of the term-specific confidence value. Thereupon, the method is complete, step 218.

Figure 6:
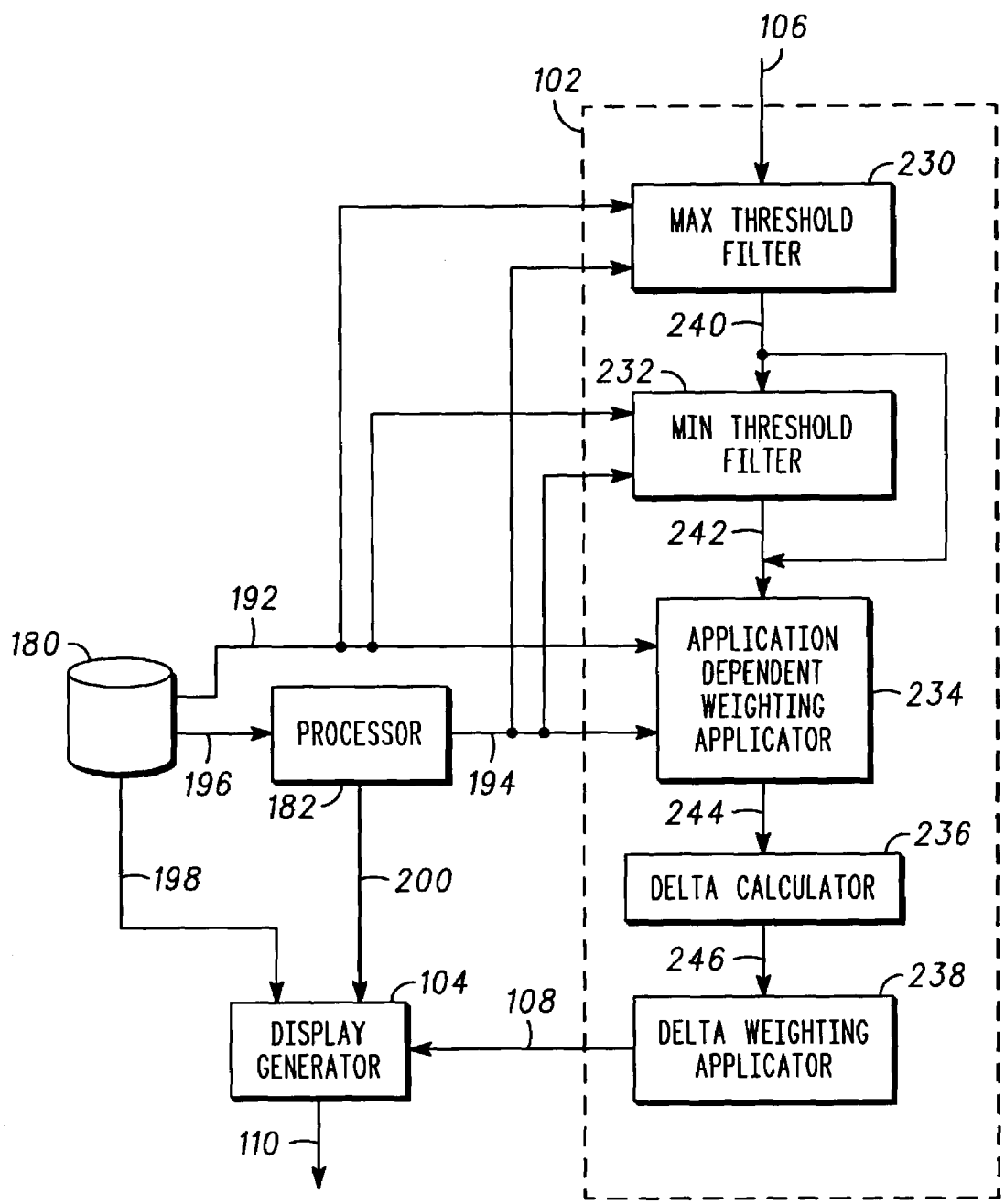
FIG. 6 illustrates another example of an apparatus for displaying speech recognition results.

FIG. 6 illustrates the recognition filter 102 having a maximum threshold filter 230, a minimum threshold filter 232, an application dependent weighting applicator 234, a delta calculator 236, and a delta weighting applicator 238, in accordance with one embodiment. The maximum threshold filter 230 receives the recognition result list 106 and the maximum confidence threshold value within signal 192 or 194 from the memory 180 or the processor 182, respectively. The maximum threshold filter 230 filters the incoming recognition result list 106 to determine if there are any recognized terms having a confidence value above the maximum threshold value. The maximum threshold filter 230 thereupon generates a maximum filtered list 240 which is provided to either the minimum threshold filter 232 or the application dependent weighting applicator 234. In one embodiment, if the maximum threshold filter 230 determines that there is one or more recognized terms above the maximum confidence threshold value, all other terms are discarded, therefore the maximum threshold recognition list does not need to be filtered by the minimum threshold filter 232. In another embodiment, the minimum threshold filter 232 eliminates all recognized terms having a confidence value below the minimum confidence threshold value, as provided from the memory 180 or the processor 194.

Thereupon, a filtered list 242 is provided to the application dependent weighting applicator 234, in response to weighting commands from either the memory 180 or the processor 194, to apply a weighting factor to the terms within the recognition result list. For example, in the event that the processor 182 is executing an application relating to airports, the application dependent weighting applicator 234 may provide a further weighting factor to all terms, such as names of cities, specifically having an airport.

Thereupon, a weighted list 244 is provided to the delta calculator 236 which calculates the delta values based on the difference between confidence levels for the various terms, such as shown in FIG. 3, delta values 162 for terms 160 based upon confidence values 164. A delta calculated list 246 is then provided to a delta weighting applicator 238, which in one embodiment, may provide further weighting of the specific terms based upon the delta factors indicating the difference between those specific values. For example, a delta waiting applicator may provide specific weighting to any term having a delta value above a specific threshold, indicating that it is a specific confidence difference between the next closest recognition term. Therein, the delta weighting applicator 238, generates the modified recognition result list 108 which is provided to the display generator 104, as discussed above with respect to FIGS. 1 and 4. The display generator 104 thereupon generates the graphical recognition result list 110, further in response to, in one embodiment, preference signals 198 and/or 200.

Figure 7:
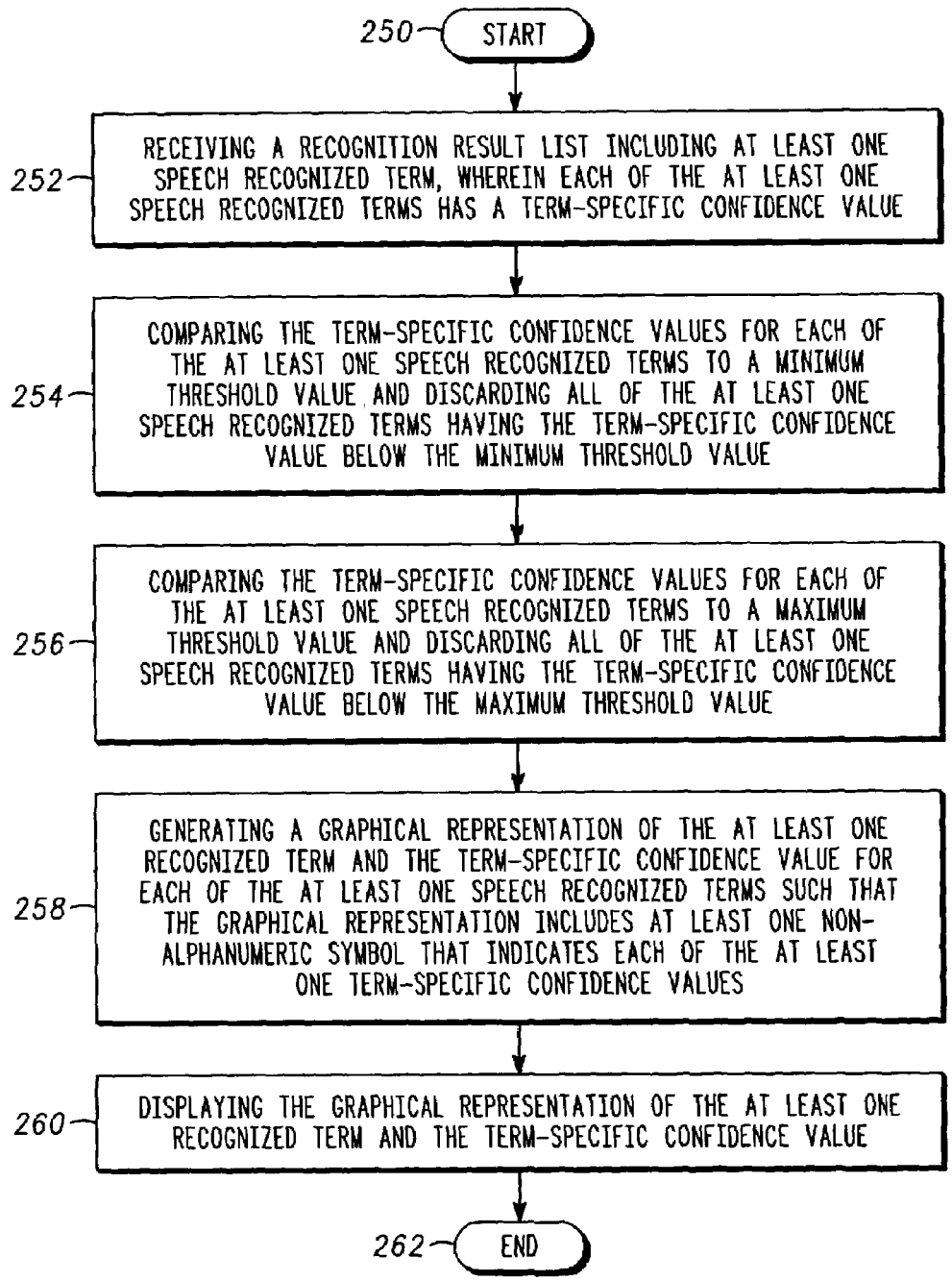
FIG. 7 illustrates another example of a method for displaying speech recognition results.

FIG. 7 illustrates another example of the steps of a method for displaying speech recognition results. The method begins, step 250, by receiving a recognition result list including at least one speech recognized term, wherein each of the at least one speech recognized terms has a term-specific confidence value, step 252. The next step, 254, includes comparing the term-specific confidence values for each of the at least one speech recognized terms to a minimum threshold value and discarding all of the at least one speech recognized terms having the term-specific confidence values below the minimum threshold value.

Next, the term-specific confidence values for each of the at least one speech recognized terms is compared to a maximum threshold value and all of the at least one speech recognized terms having the term-specific confidence values below the maximum threshold value are discarded, step 256. A graphical representation of the at least one recognized terms and the term-specific confidence value for each of the at least one speech recognized terms is generated, such that the graphical representation includes at least one non-alphanumeric symbol that indicates each of the at least one term-specific confidence values, step 258. Thereupon, the method concludes by displaying the graphical representation of the at least one recognized term and the term-specific confidence value, step 260. Thereupon, the method is complete, step 262.

FIG. 8 illustrates a display 270 of multiple recognized terms and a graphical representation of each term-specific confidence value. The first term New York 272 includes a solid bar 274 having a specific length which is greater than the length of bars for other terms, since, as illustrated in FIG. 3, the term New York has the highest confidence value 128. The term Newark 276 is displayed with a slightly smaller bar 278, which graphically indicates a confidence value below that of the term New York 272. Also illustrated are the terms New Town 280 and New London 282 having associated bars 284 and 286 which graphically represents the associated confidence values, as illustrated in FIG. 3.

FIG. 9 illustrates an alternative embodiment having the multiple terms 272, 276, 280, and 282 and associated confidence value indicators 288, 290, 292 and 294, respectively. The graphical representation of the term-specific confidence values, 288–294, indicate a geometric shape, herein as a triangle, having a plurality of bars disposed therein, where the disposition of the bars with respect to the distance from the left edge of the triangle, indicates the associated confidence value and the associated delta value between each term.

In a more straightforward approach, FIG. 10 further includes a standardized graphical representation bar 296, 298, 300 and 302 with respect to the terms 272, 276, 280 and 282, respectively. The graphical representations 296–302 include a plurality of bars having a standard thickness but varying by specific dimensions from each other, and also having a distance from the far left edge of the boxes, indicating the associated confidence value and associated delta values between different terms.

FIG. 11 illustrates, another embodiment including a representation for providing varying fonts and possible coloring of the various terms to provide for an indication of confidence values and associated deltas of multiple terms. In the display 270, the first term New York, 304, is indicated with a large box to represent that the font may be increased and the size of the actual display of the term 304 may be enlarged to indicate a higher confidence value. Furthermore, with respect to displays 306, 308 and 310, the smaller boxes indicate using a varying size of font to provide for a smaller display of the specific term, thereupon also representing and indicating the associated confidence values of the speech recognition result.

Figure 12:
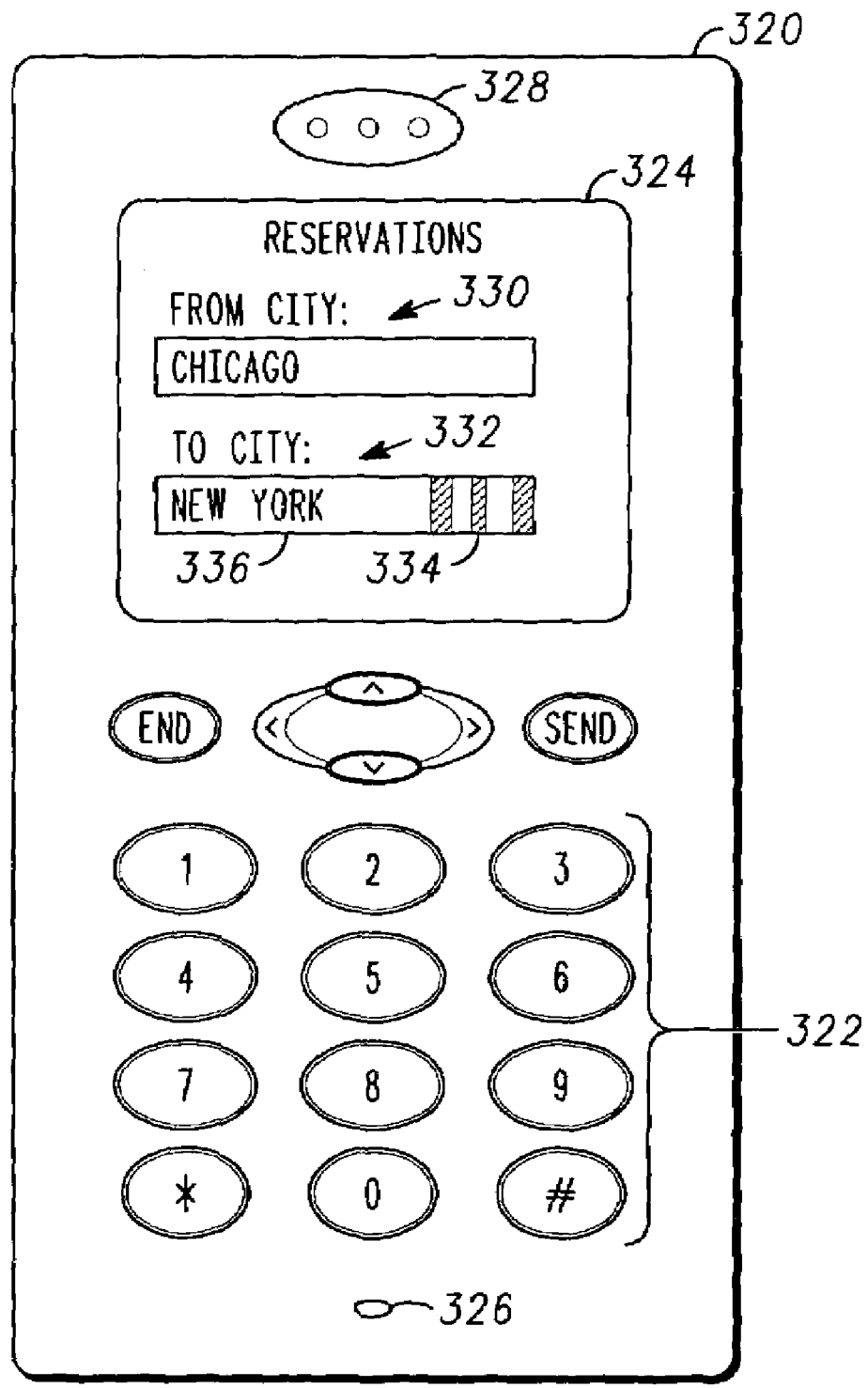
FIG. 12 illustrates a portable device having a limited display screen in displaying speech recognition results.

As recognized by one having ordinary skill in the art, the display 270 includes a larger display area being capable of displaying all of the terms at one single time. In some portable devices, the display area may be limited, therefore providing multiple terms may be problematic. Therefore, FIG. 12 illustrates a typical portable device 320 having an optional keypad 322 a display 324, a voice input 326 and a voice output 328. As illustrated in FIG. 12, the display 324 shows an example of a flight reservation system wherein a user enters a from city 330 and also enters a destination city 332. In this embodiment, the limited display area does not allow for the display of all the multiple terms, thereupon the graphical representation 334 in association with the term 336 provides the user the ability to see multiple speech recognition terms in a list format wherein only one term at a time, is readily visible, furthermore where the presence of the graphical representation indicates that there exists of possible recognized terms. The block 334 may indicate that further terms exist and may also indicate the level of confidence of the recognition of the specific term which is illustrated.

Thereupon, in this embodiment, the user is provided with a direct visual feedback of the capabilities of the speech recognition engine and the ability of the recognition engine to detect speech recognition terms with respect to a user's own input. The visual and automatic feedback may provide for future improved speech recognition capabilities by allowing the user to quickly and efficiently recognize terms that may be ambiguous to the speech recognition engine from the user, or terms that the speech recognition engine may have difficulty in properly recognizing. Therein, the user may be provided with an automatic feedback, in conjunction with a display of an N-best recognition list, such that the user may quickly and efficiently choose the proper speech recognized term in accordance with executing an application within the portable device, such as a cellular phone, 320.

In another embodiment, the display generator 104 may also generate and audible recognition result list including at least one of the plurality of recognized terms and an audible representation of the term-specific recognition confidence values. As discussed above, the display generator 104 provides a non-alphanumeric graphical representation but may also provide an audible representation of the term-specific recognition confidence value. In this embodiment, the display generator provides the audible recognition result list to a display device, such as a speaker, whereupon the display device may receive the audible recognition result list and output this audible recognition result list. In one embodiment, the audible representation includes a pitch adjustment, a volume adjustment, pronunciation speed adjustment or the addition of one or more tones to the pronunciation of a recognized term.

It should be understood that there exists implementations of other variations and modifications of the invention and its various aspects, as may be readily apparent to those of ordinary skill in the art, and that the invention is not limited by the specific embodiments described herein. For example, the embedded speech recognition engine 178 and the external speech recognition engine 190 may both be utilized to provide an N-best list to the recognition filter, whereupon the recognition filter 102 may therein generate the modified recognition result list 108 based on both speech recognition engines. It is therefore contemplated and covered by the present invention, any and all modifications, variations, or equivalents that fall within the spirit and scope of the basic underlying principles disclosed in claim herein.

What is claimed is:

1. A portable device comprising:
    a recognition filter that receives a recognition result list that includes a plurality of speech recognized terms, each speech recognized term has a term-specific recognition confidence value, such that the recognition filter generates a modified recognition result list including the plurality of speech recognized terms having the term-specific recognition confidence value associated therewith; and
    a display generator coupled to the recognition filter such that the display generator receives the modified recognition result list and generates a graphical recognition result list, wherein the graphical recognition result list includes the plurality of speech recognized terms and, for each of the plurality of speech recognized terms, a graphical representation of the corresponding term-specific recognition confidence value, wherein each graphical representation is a non-alphanumeric symbol.

2. The portable device of claim 1 further comprising:
    a display device coupled to the display generator such that the display device receives the graphical recognition result list and displays the graphical recognition result list.

3. The portable device of claim 2 further comprising:
    an audio input device capable of receiving an audio input, wherein the audio input device is operably coupled to a speech recognition engine such that the audio input may be provided to the speech recognition engine.

4. The portable device of claim 3 wherein the speech recognition generates the recognition result list.

5. The portable device of claim 3 wherein the speech recognition engine is at least one of the following: an embedded speech recognition engine and an external speech recognition engine.

6. The portable device of claim 1 wherein the graphical representation includes at least one of the following: a plurality of lines having varying colors, a plurality of lines having varying widths, a plurality of lines having varying spacing therebetween, and a geometrical element having at least one indicator line disposed therein.

7. The portable device of claim 6 wherein the display generator receives a preference signal that indicates the graphical representation for the graphical recognition result list.

8. The portable device of claim 1 wherein the recognition filter receives a maximum confidence threshold value and a minimum confidence threshold value such that the modified recognition result list is generated in view of at least one of: the maximum confidence threshold value and the minimum confidence threshold value.

9. The portable device of claim 1 wherein the recognition filter receives a weighting indicator capable of being applied to each of the plurality of speech recognized terms to adjust the term-specific recognition confidence values.

10. The portable device of claim 1 wherein the display generator separately displays a) the plurality of speech recognized terms and b) the corresponding non-alphanumeric symbols.

11. A method for displaying speech recognition results comprising:
receiving a recognition result list including a plurality of speech recognized terms, wherein each of the speech recognized terms has a term-specific confidence value;
generating a graphical representation of the plurality of speech recognized terms and the term-specific confidence value for each of the speech recognized terms such that the graphical representation includes at least one non-alphanumeric symbol that indicates each of the at least one term-specific confidence values; and
displaying the graphical representation of the plurality of speech recognized terms and the corresponding term-specific confidence values.

12. The method of claim 11 further includes, prior to generating graphical representation of the plurality of speech recognized terms and the term-specific confidence value:
comparing the term-specific confidence values for each of the speech recognized terms to a minimum threshold value and discarding all of the speech recognized terms having the term-specific confidence value below the minimum threshold value;
comparing the term-specific confidence values for each of the speech recognized terms to a maximum threshold value and discarding all of the speech recognized terms having the term-specific confidence values below the maximum threshold value.

13. The method of claim 12 further comprising:
for each of the speech recognized terms of the graphical recognition list, receiving a weighting factor.

14. The method of claim 13 wherein the weighting factors are received from at least one of the following: a memory and an executable application.

15. The apparatus of claim 14 wherein the display generator and the display device are disposed within a wireless device.

16. The method of claim 11, wherein the graphical representation includes at least one of the following: a plurality of lines having varying colors, a plurality of lines having varying widths, a plurality of lines having varying spacing therebetween, and a geometrical element having at least one indicator line disposed therein.

17. An apparatus for displaying speech recognition results comprising:
a recognition filter that receives a recognition result list, wherein the recognition result list includes a plurality of speech recognized terms, each term having a term-specific recognition confidence value, such that the recognition filter generates a modified recognition result list including the plurality of speech recognized terms having the term-specific recognition confidence value associated therewith;
a display generator coupled to the recognition filter such that the recognition display generator receives the modified recognition result list and generates a graphical recognition result list, wherein the graphical recognition result list includes the plurality of speech recognized terms and a corresponding graphical representation of the term-specific recognition confidence values, wherein the graphical representation includes a non-alpha numeric symbol that indicates each of the at least one term-specific confidence values; and
a display device coupled to the display generator such that the display device receives the graphical recognition result list and displays the graphical recognition result list.

18. The apparatus of claim 17 further comprising:
an audio input device capable of receiving an audio input, wherein the audio input device is operably coupled to a speech recognition engine such that the audio input may be provided to the speech recognition engine.

19. The apparatus of claim 18 wherein the recognition result list is generated by at least one of the following: an embedded speech recognition engine and an external speech recognition engine.

20. The apparatus of claim 17 wherein the graphical representation includes at least one of the following: a plurality of lines having varying colors, a plurality of lines having varying widths, a plurality of lines having varying spacing therebetween, and a geometrical element having at least one indicators lines disposed therein.

21. The apparatus of claim 17 further comprising:
the display generator receives a preference signal that indicates the graphical representation for the graphical recognition result list;
the recognition filter receives a maximum confidence threshold value and a minimum confidence threshold value such that the modified recognition result list is generated in view of at least one of: the maximum confidence threshold value and the minimum confidence threshold value; and
the recognition filter receives a weighting indicator capable of being applied to each of the plurality of speech recognized terms to adjust the term-specific recognition confidence values.

22. An apparatus for display speech recognition results comprising:
a memory storing executable instructions; and
a processor capable of receiving the executable instructions, such that the processor, in response to the executable instructions:

receives a recognition result list including a plurality of speech recognized terms, wherein each of the speech recognized terms has a term-specific confidence value;

generates a graphical representation of the plurality of speech recognized terms and the term-specific confidence values for each of the at least one speech recognized terms such that the graphical representation includes at least one non-alphanumeric symbol that indicates each of the term-specific confidence values; and displays the graphical representation of the plurality of speech recognized terms and the term-specific confidence value.

23. The apparatus of claim 22 wherein the processor, in response to the executable instructions, prior to generating a graphical representation of the plurality of speech recognized terms and the term-specific confidence values:

compares the term-specific confidence values for each of the speech recognized terms to a minimum threshold value and discarding all of the speech recognized terms having the term-specific confidence value below the minimum threshold value;

compares the term-specific confidence values for each of the speech recognized terms to a maximum threshold value and discarding all of the speech recognized terms having the term-specific confidence values below the maximum threshold value.

24. The apparatus of claim 22 wherein the graphical representation includes at least one of the following: a plurality of lines having varying colors, a plurality of lines having varying widths, a plurality of lines having varying spacing therebetween, and a geometrical element having at least one indicator line disposed therein.

25. An apparatus for displaying speech recognition results comprising:

a recognition filter that receives a recognition result list, wherein the recognition result list includes a plurality of speech recognized terms, each term having a term-specific recognition confidence value, such that the recognition filter generates a modified recognition result list including the plurality of speech recognized terms having the term-specific recognition confidence value associated therewith;

a display generator coupled to the recognition filter such that the recognition display generator receives the modified recognition result list and generates an audible recognition result list, wherein the audible recognition result list includes the plurality of speech recognized terms and an audible representation of the corresponding term-specific recognition confidence values; and a display device coupled to the display generator such that the display device receives the audible recognition result list and outputs the audible recognition result list.

26. The apparatus of claim 25 wherein audible representation includes at least one of the following: pitch adjustment, volume adjustment, pronunciation speed adjustment and adjustment of an at least one tone.

* * * * *